Jan. 29, 1929.
T. V. BUCKWALTER
1,700,307
ROLLER BEARING AXLE CONSTRUCTION
Filed Jan. 23, 1928
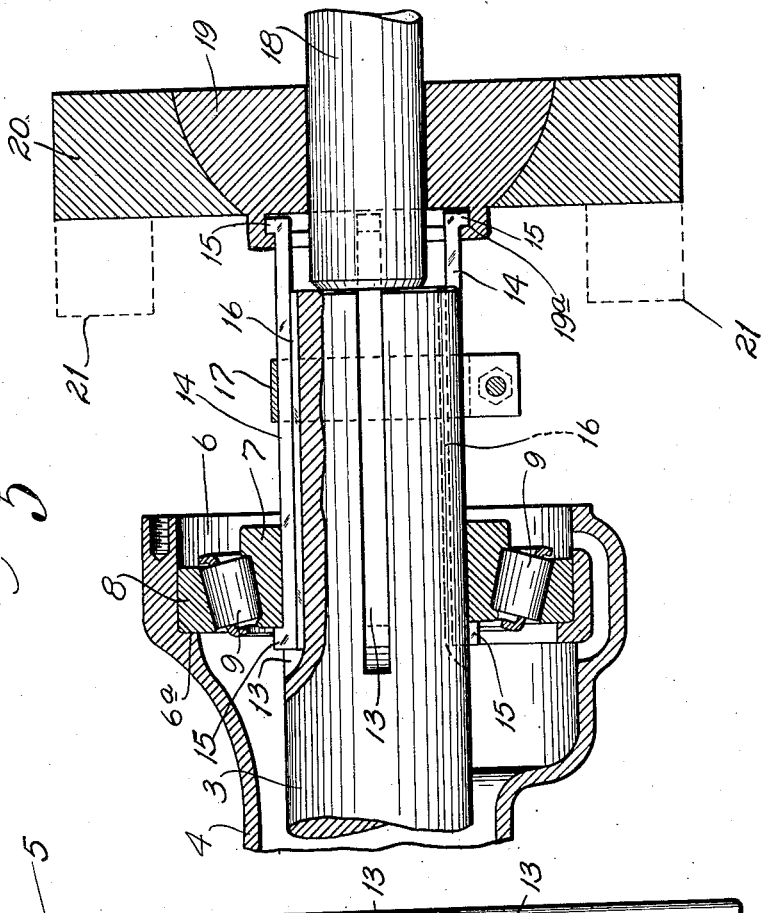
INVENTOR:
T. V. Buckwalter
HIS ATTORNEYS.

Patented Jan. 29, 1929.

1,700,307

UNITED STATES PATENT OFFICE.

TRACY V. BUCKWALTER, OF CANTON, OHIO, ASSIGNOR TO THE TIMKEN ROLLER BEARING COMPANY, OF CANTON, OHIO, A CORPORATION OF OHIO.

ROLLER-BEARING-AXLE CONSTRUCTION.

Application filed January 23, 1928. Serial No. 248,695.

This invention relates to roller bearing axle constructions of the type wherein the roller bearing is interposed between the axle and the end of the axle housing with its inner raceway member press-fitted on said axle so as to be able to resist end thrust. A practical objection of such press-fit has been the difficulty of removing said raceway member. The purpose of the present invention is to provide means whereby the inner raceway member is adapted for removal from the axle and thereby permit the other parts of the bearing to be removed. The invention consists principally in providing openings between the axle and the raceway member, thereby permitting pulling implements to be inserted in said openings and engaged with the inner end of said raceway member to remove the same from the axle. The invention also consists in the construction, combinations and arrangements of parts hereinafter described and claimed.

In the accompanying drawing, which forms part of this specification and wherein like symbols refer to like parts wherever they occur:

Fig. 1 is a longitudinal section through one end of a roller bearing railway car axle embodying my invention; and Fig. 2 is a similar section showing the axle mounted in a press, parts of the axle being shown removed to permit the inner raceway member and the axle to be engaged by the pulling mechanism of the press.

The roller bearing axle construction as shown in the accompanying drawing comprises a solid axle 3, which is mounted in a tubular axle housing 4 with each end projecting therebeyond and having a wheel 5 pressed thereon. Each end portion of the axle housing 4 is flared outwardly to form an enlarged cylindrical chamber 6 adapted to receive a roller bearing comprising a cone or inner raceway member 7 press-fitted on the axle, a conical cup or outer raceway member 8 mounted in the cylindrical chamber formed by the enlarged end portion of the axle housing and a series of conical bearing rollers 9 disposed between said raceway members. The inner or thicker end of the conical cup 8 abuts against a shoulder 6ª formed at the inner end of the chamber 6 in the end portion of the axle housing 4; and the cone 7 has a press-fit on the axle sufficient to resist the end thrust to which it is subject in practice.

A suitable collar or spacing member 10 is mounted on the axle between the hub of the wheel 5 and the large end of the bearing cone 7; and the end of the enlarged chamber 6 in the end portion of the axle housing is closed by means of an annular closure plate 11 which surrounds the spacing collar 10 and is removably secured to the end of the axle housing by cap screws 12.

In order to permit the inner raceway member 7 of the roller bearing to be stripped from the end of the axle 3, the peripheral surface of said axle is provided with a series of circumferentially spaced grooves 13 which extend longitudinally of the axle inward from the end thereof to points spaced inwardly from the inner end of said inner raceway member. These longitudinal grooves form openings between the peripheral surfaces of the axle and the bore of the inner raceway member adapted to accommodate suitable pulling implements preferably in the form of bars 14 provided with hook or shouldered end portions 15.

With the above axle construction, when it is desired to remove the conical inner raceway member 7 from the axle 3, the entire axle construction is preferably removed from the truck and mounted in a suitable wheel press where the wheel 5, spacing collar 10 and closure plate 11 are removed from the end of the axle construction and the pulling bars 14 inserted in the longitudinal grooves 13 in the axle with their hooked or shouldered inner end portions 14 in abutting relation to the inner end of the inner raceway member. Filler strips 16 are then placed in the grooves 13 to maintain the shouldered inner ends of the pulling bars in engagement with the inner end of the cone; and the pulling bars are then clamped to the axle by means of a split clamping band 17. The axle construction is then positioned in the press with the end of the axle 3 in position to be engaged by the end of the ram 18 of the press and with the hooks of the outer ends of the pulling bars seated within an annular groove 19ª in the front face of the ball plate 19 of the press, which plate is provided with a central bore within which the ram reciprocates and has a ball and socket connection with the socket plate 20 of the press. With the parts thus positioned in the press the parallels 21 thereof are placed against the socket plate 20 and the ram 18 is made to bear axially against the end of the axle 3 and thereby presses the axle through the cone 7 which is held against movement with the axle by means of the hooked inner ends of the pulling bars 14. When the cone 7 is removed, the rollers 9 and outer bearing cup 8 may be readily removed. If desired, the ram 18 may be used as an abutment for the outer end of the axle 3 and the cone 8 may be stripped from the end of said axle by pulling the bars 14 outwardly.

It is obvious that by adapting the inner raceway member of the bearing for engagement by a pulling device, it becomes practical to press-fit such members on axles or shafts with sufficient firmness to resist the heavy end thrust to which it is subject in practice, as the bearings or any other parts that may be mounted on the same axle or shaft are thereby made removable for repair or replacement.

Obviously, the invention is applicable to roller bearing axle constructions of different types; therefore, I do not wish to be limited to the type of axle shown and described.

What I claim is:

1. The combination of an axle and a roller bearing that comprises an inner bearing member press-fitted on said axle, said axle being provided with a groove in its peripheral surface which extends longitudinally of said axle beneath said member and is adapted to accommodate a pulling implement.

2. The combination of an axle and a roller bearing that comprises a cone press-fitted on said axle, said axle being provided with a series of circumferentially spaced peripheral grooves that extend longitudinally of the axle through the bore of said cone and are adapted to accommodate pulling implements.

Signed at Canton, Ohio, this 18th day of January, 1928.

TRACY V. BUCKWALTER.